United States Patent
Huang et al.

(10) Patent No.: US 12,548,288 B2
(45) Date of Patent: Feb. 10, 2026

(54) METHOD FOR PREDICTING RECONSTRUCTABILIT, COMPUTER DEVICE AND STORAGE MEDIUM

(71) Applicant: Shenzhen University, Guangdong (CN)

(72) Inventors: Hui Huang, Shenzhen (CN); Yilin Liu, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 290 days.

(21) Appl. No.: 18/356,815

(22) Filed: Jul. 21, 2023

(65) Prior Publication Data
US 2024/0037898 A1  Feb. 1, 2024

(30) Foreign Application Priority Data
Jul. 25, 2022  (CN) .......................... 202210875073.X

(51) Int. Cl.
G06K 9/00  (2022.01)
G06V 10/46  (2022.01)
(Continued)

(52) U.S. Cl.
CPC ............ *G06V 10/46* (2022.01); *G06V 10/806* (2022.01); *G06V 10/82* (2022.01)

(58) Field of Classification Search
CPC ...... G06V 10/25; G06V 10/454; G06V 10/46; G06V 10/806; G06V 10/82; G06V 20/64
See application file for complete search history.

(56) References Cited

U.S. PATENT DOCUMENTS

| | | | | |
|---|---|---|---|---|
| 2010/0166320 | A1* | 7/2010 | Paquier | G06V 10/451 382/209 |
| 2013/0322728 | A1* | 12/2013 | Jacobs | G06T 11/003 382/132 |

(Continued)

FOREIGN PATENT DOCUMENTS

| | | |
|---|---|---|
| CN | 101065061 A | 10/2007 |
| CN | 101082765 A | 12/2007 |

(Continued)

OTHER PUBLICATIONS

Mostegel, Christian, et al. "Uav-based autonomous image acquisition with multi-view stereo quality assurance by confidence prediction." Proceedings of the IEEE Conference on Computer Vision and Pattern Recognition Workshops. 2016. (Year: 2016).*

(Continued)

*Primary Examiner* — Hadi Akhavannik
(74) *Attorney, Agent, or Firm* — GREENBLUM & BERNSTEIN, P.L.C.

(57) ABSTRACT

Disclosed are a method for predicting reconstructability, a computer device, and a storage medium. In the method, a plurality of viewpoints to be evaluated for a target sampling point are obtained. The target sampling point is located on a rough geometric model. A spatial characteristic of the target sampling point is obtained based on spatial relationships between the plurality of viewpoints to be evaluated and the target sampling point. An image characteristic of the target sampling point is extracted from a target captured image based on a plurality of pre-acquisition viewpoints. The pre-acquisition viewpoints are obtained based on poses of a camera capturing the target captured image. The target captured image is an image containing the target sampling point. The predicting reconstructability for the target sample (Continued)

point is predicted based on the image characteristic and the spatial characteristic.

17 Claims, 7 Drawing Sheets

(51) Int. Cl.
*G06V 10/80* (2022.01)
*G06V 10/82* (2022.01)

(56) References Cited

U.S. PATENT DOCUMENTS

| 2014/0300599 | A1* | 10/2014 | Tuzel | G06V 10/60 |
| | | | | 345/426 |
| 2018/0204111 | A1* | 7/2018 | Zadeh | G06V 10/764 |
| 2019/0138786 | A1* | 5/2019 | Trenholm | G06F 18/241 |
| 2019/0197295 | A1* | 6/2019 | Jorgensen | H04N 25/133 |
| 2019/0364265 | A1* | 11/2019 | Matsunobu | H04N 13/194 |
| 2019/0371080 | A1* | 12/2019 | Sminchisescu | G06T 17/20 |

FOREIGN PATENT DOCUMENTS

| CN | 112884894 A | 6/2021 |
| WO | 2020/117657 A1 | 6/2020 |
| WO | 2021/184530 A1 | 9/2021 |

OTHER PUBLICATIONS

Liu et al., "VGF-Net: Visual-Geometric Fusion Learning for Simultaneous Drone Navigation and Height Mapping," (Apr. 7, 2021); arXiv:2104.03109v1 [cs.CV] (12 pages).

Lin et al., "A Simple Interactive Registration Method for 3D Volumetric Medical Image," Journal of Computer-Aided Design & Computer Graphics (Feb. 2017); 29(2)229:-235.

Zhou et al., "Offsite Aerial Path Planning for Efficient Urban Scene Reconstruction," ACM Trans. Graph (Dec. 2020); 39(6):1:1-1:16.

Na et al., "Image synthesis algorithm based on sample cutout and adaptive color," Chinese Journal of Liquid Crystals and Displays (Fe. 2018); 33(2):156-164.

* cited by examiner

METHOD FOR PREDICTING RECONSTRUCTABILIT, COMPUTER DEVICE AND STORAGE MEDIUM

CROSS-REFERENCE TO RELATED APPLICATIONS

The present application claims priority to Chinese patent application No. 202210875073X, entitled "METHOD AND DEVICE FOR PREDICTING RECONSTRUCTABILITY, COMPUTER DEVICE AND STORAGE MEDIUM", filed on Jul. 25, 2022, the entire content of which is incorporated herein by reference.

TECHNICAL FIELD

The present disclosure relates to the computer vision technology, and in particular, to a method for predicting reconstructability, a computer device, and a storage medium.

BACKGROUND

Before collecting data for 3D city reconstruction, it is often necessary to plan flight routes for the target area. The quality of route planning affects the effect of the model obtained by reconstructing aerial images. Therefore, multiple suitable acquisition viewpoints need to be selected to specify the route. In the process of selecting multiple acquisition viewpoints, the reconstructabilities of multiple acquisition viewpoints need to be predicted.

In general, the reconstructability is calculated using a rough scene model obtained by pre-flight or a rough scene module obtained from satellite images. However, errors or uncertainties in the rough scene model affect the accuracy of the reconstructability. Therefore, the results of the reconstructability calculated using the rough scene need to be further optimized to improve the accuracy of the reconstructability.

SUMMARY

In a first aspect, the present disclosure provides a method of predicting reconstructability. The method includes obtaining a plurality of viewpoints to be evaluated for a target sampling point. The target sampling point is located on a rough geometric model. A spatial characteristic of the target sampling point is obtained based on spatial relationships between the plurality of viewpoints to be evaluated and the target sampling point. An image characteristic of the target sampling point is extracted from the target captured image based on a plurality of pre-acquisition viewpoints. The pre-acquisition viewpoints are obtained based on based the poses of a camera capturing the target captured image. The target captured image is an image containing the target sampling point. The reconstructability for the target sampling point is predicted based on the image characteristic and the spatial characteristic.

In some embodiments, the reconstructability is comprehensive reconstructability. The method further includes obtaining geometric reconstructability for the target sample point based on the spatial characteristic.

In some embodiments, the obtaining the spatial characteristic of the target sampling point based on the spatial relationships between the plurality of viewpoints to be evaluated and the target sampling point includes: for each viewpoint to be evaluated, determining a viewpoint characteristic of the viewpoint to be evaluated based on the spatial relationship between the viewpoint to be evaluated and the target sampling point; and obtaining the spatial characteristic of the target sampling point by combining a plurality of viewpoint characteristics corresponding to the plurality of viewpoints to be evaluated.

In some embodiments, the extracting the image characteristic of the target sampling point from the target captured image based on the plurality of pre-acquisition viewpoints includes: obtaining a plurality of pre-acquisition viewpoints based on the poses of the camera capturing the target captured image; extracting a high-dimensional characteristic from the target captured image; for each pre-acquisition viewpoint, converting three-dimensional position information of the target sampling point into two-dimensional position information in the target captured image based on a six-dimensional coordinate of the pre-acquisition viewpoint, and extracting a point image characteristic of the target sampling point from the high-dimensional characteristic based on the two-dimensional position information; and obtaining the image characteristic of the target sampling point by combining a plurality of the point image characteristics.

In some embodiments, the predicting the reconstructability for the target sample point based on the image characteristic and the spatial characteristic includes: obtaining a weight matrix based on the spatial characteristic and the image characteristic; and obtaining the reconstructability for the target sampling point based on the weight matrix and the image characteristic.

In one embodiment, for each viewpoint to be evaluated, the spatial relationship comprises a three-dimensional polar coordinate of the viewpoint to be evaluated with respected to the target sample point, a first included angle between a normal at the target sampling point and a direction from the target sampling point to the viewpoint to be evaluated, and a second included angle between a viewing direction of the viewpoint to be evaluated and a direction from the viewpoint to be evaluated to the target sampling point.

In some embodiments, a standard multilayer perception $G_e: R^{1 \times 256} \to R^1$ is employed to learn to determine the geometric reconstructability Rj from the spatial characteristic $F_{p_j}^{nth}$, a specific equation is as follows:

$$R_j = G_e(F_{p_j}^{nth}).$$

In some embodiments, a multilayer perception $G_1(v_i, p_j): R^{1 \times 5} \to R^{1 \times 256}$ is employed to extract the viewpoint characteristic $F_{v_i,p_j}^{1st}$, $R^{1 \times 5}$ is a dimension of parameters, and $R^{1 \times 256}$ is a dimension of returned values, a specific equation for determining the viewpoint characteristic is as follows:

$$F_{v_i,p_j}^{1st} = G(v_i, p_j)$$

where $F_{v_i,p_j}^{1st}$ is the viewpoint characteristic of the viewpoint $V_i$ to be evaluated of the target sampling point $P_j$.

In some embodiments, a method for generating the weight matrix is generated includes: multiplying a spatial characteristic matrix by a query matrix of an encoder to obtain a first result; multiplying a key matrix of the encoder by an image characteristic matrix to obtain a second result; multiplying the first result by the second result to obtain a third result, and generating the weight matrix based on the third result and a hidden layer size in the encoder.

In a second aspect, the present disclosure also provides a computer device. The computer device includes a memory and a processor. The memory stores a computer program therein. The processor, when executing the computer program, performs the steps of the aforementioned method for predicting reconstructability.

In a third aspect, the present disclosure also provides a non-transitory computer-readable storage medium having stored therein a computer program. The computer program, when executed by a processor, causes the processor to perform the steps of the aforementioned method for predicting reconstructability.

In a fourth aspect, the present disclosure also provides a computer program product including a computer program. The computer program, when executed by a processor, cases the processor to perform the steps of the aforementioned method for predicting reconstructability.

BRIEF DESCRIPTION OF THE DRAWINGS

In order to better illustrate the embodiments of the present disclosure, a brief introduction will be made to the drawings that are required for describing the embodiments. It can be understood that the drawings described below are only to assist in describing some embodiments of the present invention, and not to limit the disclosure and the protection scope of the present disclosure.

DETAILED DESCRIPTION OF THE EMBODIMENTS

In order to make the purpose, technical solutions, and advantages of the present disclosure more clear, the present disclosure will be further described in detail below with reference to the accompanying drawings and embodiments. It should be understood that the specific embodiments described herein are only used to explain the present disclosure, but not to limit the present disclosure.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Figure 1:
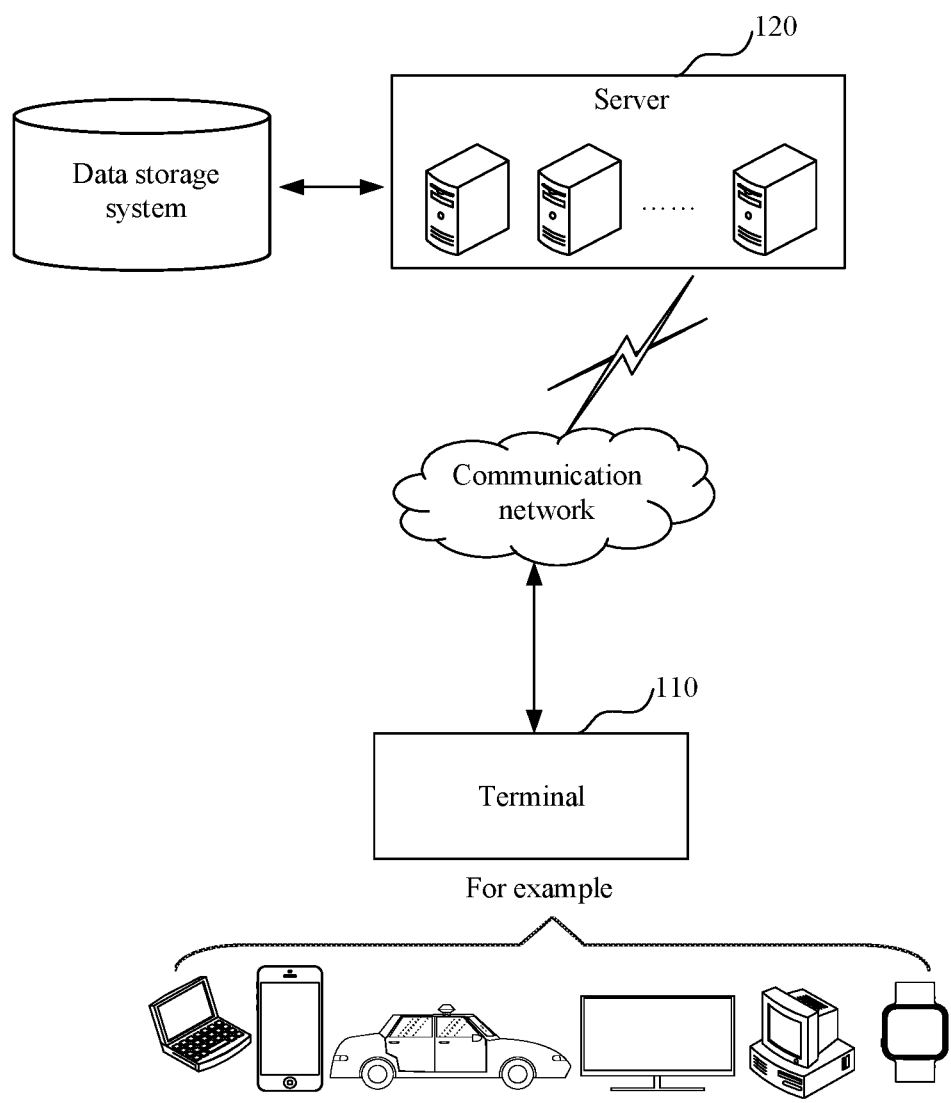
FIG. 1 is an application environment diagram of a method for predicting reconstructability according to an embodiment.

A method for predicting reconstructability provided by the embodiments of the present disclosure may be applied to an application environment shown in FIG. 1. A terminal 110 communicates with a server 120 through a network. A data storage system may store data that needs to be processed by the server 120. The data storage system may be integrated in the server 120, or may be placed in a cloud server or other network servers. The terminal 110 may be, but is not limited to, various personal computers, laptops, smart phones, tablet computers, and portable wearable devices. The server 120 may be implemented with an independent server or a server cluster composed of multiple servers.

The server 120 can obtain a plurality of viewpoints to be evaluated for a target sampling point. The target sampling point is located on a rough geometric model. The server 120 determines a spatial characteristic of the target sampling point based on spatial relationships between the plurality of viewpoints to be evaluated and the target sampling point. The server 120 extracts an image characteristic of the target sampling point from a target captured image based on a plurality of pre-acquisition viewpoints. The pre-acquisition viewpoints are obtained based on the poses of the camera capturing the target captured image. The target captured image is the image containing the target sampling point. The server 120 predicts reconstructability for the target sampling point based on the image characteristic and the spatial characteristic. The server 120 can send the reconstructability to the terminal 110. The terminal 110 uses the reconstructability to plan an aerial path.

In some embodiments, the terminal 110 may also be replaced by a server. The implementation of the terminal 110 is not limited in the present disclosure.

In other embodiments, the server 120 may also be replaced by a terminal. The implementation of the server 120 is not limited in the present application.

Figure 2:
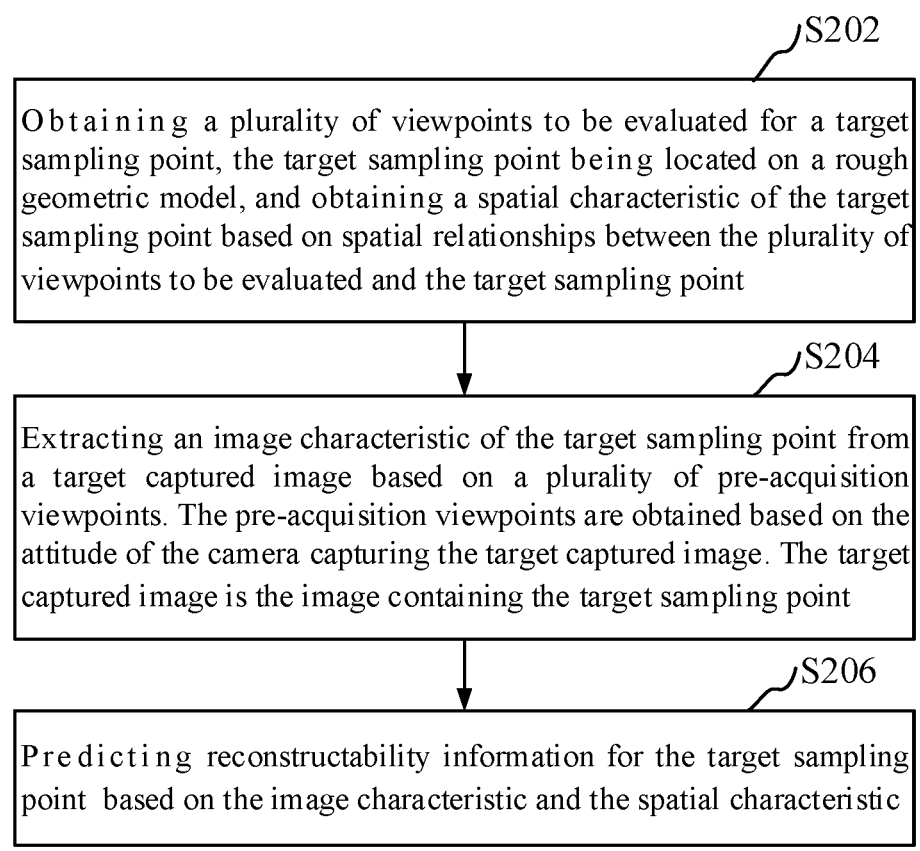
FIG. 2 is a schematic flow chart of a method for predicting reconstructability according to an embodiment.

In some embodiments, as shown in FIG. 2, a method for predicting reconstructability is provided. The embodiments will be illustrated by taking the method applied to a terminal as an example. It should be understood that the method may also be applied to a server, and may also be applied to a system including a terminal and a server, and implemented by interactions between the terminal and the server. In the embodiments, the method includes the following steps S202-S206.

In the step S202, a plurality of viewpoints to be evaluated for a target sampling point are obtained, the target sampling point is located on a rough geometric model, and a spatial characteristic of the target sampling point is obtained based on spatial relationships between the plurality of viewpoints to be evaluated and the target sampling point.

The rough geometric model is a geometric model corresponding to a target scene to be reconstructed. It can be understood that the geometric model is rough because the target scene is to be reconstructed. The spatial relationships may include coordinate information, angle information, etc.

Specifically, the server selects a target sampling point to be reconstructed located on a rough geometric model, and obtains a plurality of viewpoints to be evaluated for the target sampling point. The server obtains a spatial characteristic of the target sampling point based on spatial relationships between the plurality of viewpoints to be evaluated and the target sampling point.

In some embodiments, for each viewpoint to be evaluated, the spatial relationship includes a coordinate of the viewpoint to be evaluated with respect to the target sampling point, angle information between the viewpoint to be evaluated and the target sampling point, etc.

In some embodiments, the server can obtain geometric reconstructability based on the spatial characteristic. The geometric reconstructability is a type of reconstructability, which can be directly used in the downstream task.

In some embodiments, the server can combine viewpoint characteristics of the viewpoints to be evaluated with respect to the target sampling point to obtain the spatial characteristic.

In the step S204, an image characteristic of the target sampling point is extracted from the target captured image based on a plurality of pre-acquisition viewpoints. The pre-acquisition viewpoints are obtained based on the poses of the camera capturing the target captured image. The target captured image is the image containing the target sampling point.

Specifically, the server obtains a plurality of pre-acquisition viewpoints based on the poses of the camera capturing the target captured image, and determines the target captured image containing the target sampling point. Further, the server extracts an image characteristic of the target sampling point from the target captured image based on the plurality of pre-acquisition viewpoints. The pre-acquisition viewpoints are the viewpoints from which the target sampling point is pre-acquired.

In some embodiments, for each pre-acquisition viewpoint, the server may use a six-dimensional coordinate of the pre-acquisition viewpoint to extract a point image characteristic of the target sampling point in the target captured image corresponding to the pre-acquisition viewpoint. The server combines a plurality of point image characteristics to obtain the image characteristic.

In the step S206, reconstructability for the target sampling point is predicted based on the image characteristic and the spatial characteristic.

The reconstructability can be used to represent the level of quality at which the target sampling point can be reconstructed. The viewpoint to be evaluated can be evaluated based on the reconstructability.

Specifically, the server combines the image characteristic and the spatial characteristic to predict the reconstructability for the target sampling point.

According to the method for predicting reconstructability, a plurality of viewpoints to be evaluated for the target sampling point are obtained. The target sampling point is located on a rough geometric model. The spatial characteristic of the target sampling point is obtained based on the spatial relationships between the plurality of viewpoints to be evaluated and the target sampling point. The image characteristic of the target sampling point is extracted from the target captured image based on a plurality of pre-acquisition viewpoints. The pre-acquisition viewpoints are obtained based on the poses of the camera capturing the target captured image. The target captured image is the image containing the target sampling point. The reconstructability for the target sampling point is predicted based on the image characteristic and the spatial characteristic. In this way, the image characteristic obtained by using the real target captured image and the spatial characteristic obtained by using the rough geometric model are combined for analysis, thereby improving the accuracy of the reconstructability.

In some embodiments, for each viewpoint to be evaluated, the spatial relationship includes a three-dimensional polar coordinate of the viewpoint to be evaluated with respect to the target sampling point, a first included angle between the normal at the target sampling point and the direction from the target sampling point to the viewpoint to be evaluated, and a second included angle between the viewing direction of the viewpoint to be evaluated and the direction from the viewpoint to be evaluated to the target sampling point. Each viewpoint to be evaluated includes a position and a viewing direction.

Figure 3:
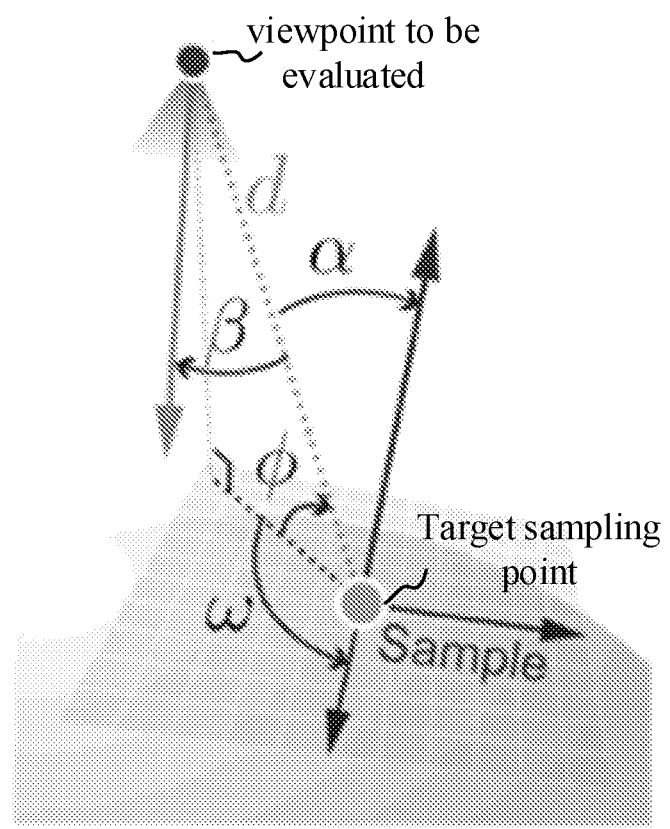
FIG. 3 is a principle schematic diagram of a method for predicting reconstructability according to an embodiment.

For example, as shown in FIG. 3, for each target sampling point $P_j$, the server determines a plurality of viewpoints to be evaluated and calculates spatial relationships between the plurality of viewpoints to be evaluated and the target sampling point $P_j$. For each viewpoint to be evaluated, the server determines a three-dimensional polar coordinate ($\omega$, $\phi$, d) of the viewpoint to be evaluated with respect to the target sampling point, determines a first included angle $\alpha$ between the normal at the target sampling point and the direction from the target sampling point to the viewpoint to be evaluated, and determines a second included angle $\beta$ between the viewing direction of the viewpoint to be evaluated and the direction from the viewpoint to be evaluated to the target sampling point.

In this embodiment, the spatial relationship includes the three-dimensional polar coordinates, the first included angle, and the second included angle, thereby improving the effectiveness of the generated spatial characteristic.

In some embodiments, obtaining the spatial characteristic of the target sampling point based on the spatial relationships between the plurality of viewpoints to be evaluated and the target sampling point includes: for each viewpoint to be evaluated, determining a viewpoint characteristic of the viewpoint to be evaluated based on the spatial relationship between the viewpoint to be evaluated and the target sampling point; and obtaining the spatial characteristic of the target sampling point by combining a plurality of viewpoint characteristics corresponding to the plurality of viewpoints to be evaluated.

Specifically, for each viewpoint to be evaluated, the server can determine the viewpoint characteristic of the viewpoint to be evaluated based on the spatial relationship between the viewpoint to be evaluated and the target sampling point. The server combines a plurality of viewpoint characteristics corresponding to the plurality of viewpoints to be evaluated to obtain the spatial characteristic of the target sampling point.

For example, the server may use a multilayer perception (MLP) $G_1(v_i, p_j)$: $R^{1\times 5} \to R^{1\times 256}$ to extract a viewpoint characteristic $F_{v_i,p_j}^{1st}$, $R^{1\times 5}$ is the number of dimensions of parameters, and $R^{1\times 256}$ is the number of dimensions of returned values. The specific equation is as follows:

$$F_{v_i,p_j}^{1st} = G(v_i, p_j)$$

where $F_{v_i,p_j}^{1st}$ is the viewpoint characteristic of the viewpoint $V_i$ to be evaluated for the target sampling point $P_j$. The viewpoint characteristic indicates the impact of a single viewpoint to be evaluated on the local scene geometry during reconstruction. It can be understood that the effect of the viewpoint $V_i$ to be evaluated on the target sampling point $P_j$ can be better evaluated in this way.

In a multi view system (MVS) framework, viewpoints are highly coupled. Changes in relative positions and orientations between viewpoints have a great effect on the final reconstruction. Therefore, higher-order correlation between viewpoints can be further extracted. The server may employ the encoder of the Transformer model to learn the correlation between the viewpoints to be evaluated and the target sampling point, extract the contribution of each viewpoint to be evaluated, and then convert a plurality of single viewpoint characteristics $F_{v_i,p_j}^{1st}$ into a combined spatial characteristic $F_{p_j}^{nth}$. Specifically, the server pre-trains the encoder, such that:

$$W_e = \frac{G_Q\left(F_p, \{F^{1st}_{v_i,p_j}\}_{i=1}^K\right) G_K\left(F_p, \{F^{1st}_{v_i,p_j}\}_{i=1}^K\right)^T}{\sqrt{d_k}}$$

$$F^{nth}_{p_j} = G_n\left(F_p, \{F^{1st}_{v_i,p_j}\}_{i=1}^K\right) = W G_V\left(F_p, \{F^{1st}_{v_i,p_j}\}_{i=1}^K\right)$$

where K is the number of viewpoints in $\{V_i\}$ that are visible at the target sampling point $P_j$; $G_Q$, $G_K$, and $G_V$ are the query matrix, key matrix, and value matrix, respectively, for generating an attention matrix with size (K+1, K+1); $F_p$ is a trainable parameter; and $d_k$ is the hidden layer size. The server can extract a weight matrix of the viewpoint to be evaluated through the encoder, and use the trainable parameter $F_p$: $R^{1 \times 256}$ to represent the spatial correlation preference, which facilitates predicting the combined spatial characteristic.

In the embodiments, the server can combine a plurality of viewpoint characteristics and use a data-driven method to dynamically learn the correlation between the viewpoints to be evaluated and the correlation between the viewpoint to be evaluated and the target scene, so as to predict the reconstructability of the target scene, improving the accuracy.

In some embodiments, the reconstructability is comprehensive reconstructability. The method further includes obtaining geometric reconstructability for the target sampling point based on the spatial characteristic.

Specifically, the reconstructability is comprehensive reconstructability, which integrates the image characteristic and the spatial characteristic. In the case that there is no target captured image, the server can obtain geometric reconstructability for the target sampling point based on the spatial characteristic.

For example, the server can use standard multilayer perception $G_e$: $R^{1 \times 256} \to R^1$ to learn to determine the geometric reconstructability from the combined spatial characteristic $F_{p_j}^{nth}$. The specific equation is as follows:

$$R_j = G_e(F_{p_j}^{nth})$$

In the embodiments, the geometric reconstructability is obtained based on the spatial characteristic, so that the reconstructability can also be predicted without a target captured image, which improves the versatility of application.

In some embodiments, extracting the image characteristic of the target sampling point from the target captured image based on the plurality of pre-acquisition viewpoints includes: obtaining a plurality of pre-acquisition viewpoints based on the poses of the camera capturing the captured target capture image; extracting a high-dimensional characteristic from the target captured image; for each pre-acquisition viewpoint, converting three-dimensional position information of the target sampling point into two-dimensional position information in the target captured image based on a six-dimensional coordinate of the pre-acquisition viewpoint; extracting a point image characteristic of the target sampling point from the high-dimensional characteristic based on the two-dimensional position information; and obtaining the image characteristic of the target sampling point by combining a plurality of the point image characteristics.

Specifically, the server determines a target captured image and obtains a plurality of pre-acquisition viewpoints based on the poses of the camera capturing the target captured image. The server extracts a high-dimensional characteristic from the target captured image and, for each pre-acquisition viewing point, converts the three-dimensional position information of the target sampling point into the two-dimensional position information in the target captured image based on the six-dimensional coordinate of the pre-acquisition viewing point. Further, the server extracts the point image characteristic of the target sampling point from the high-dimensional characteristic based on the two-dimensional position information. The image characteristic of the target sampling point is obtained by combining a plurality of the point image characteristics.

For example, for each target sampling point $P_j$ on a rough geometric model, the server can collect pre-acquisition viewpoints $\{\widehat{V_k}\}_{\hat{k}=1}^{\hat{K}}$ from a camera pose $V_1$ (the multiple ^ used below are used to distinguish definitions from the above equations), and extract a high-dimensional characteristic $\widehat{g}_{\hat{k}}$ from each target captured image $\widehat{I_{\hat{k}}}$ using a pre-trained convolution neural network. The point image characteristic $\widehat{F^{1st}_{\widehat{V_{\hat{k}}},P_j}}$ can be calculated according to the following equations:

$$\widehat{g}_{\hat{k}} = \widehat{G_I}(\widehat{I_{\hat{k}}})$$

$$\widehat{F^{1st}_{\widehat{V_{\hat{k}}},P_j}} = \text{RoI}(\widehat{g}_{\hat{k}}, \text{Proj}(p_j, \widehat{V_{\hat{k}}}))$$

where $\widehat{G_I}$ is a pre-trained characteristic extraction model with a fixed weight during training, configured for generating a high-dimensional characteristic $\widehat{g}_{\hat{k}}$; a three-dimensional target sampling point $P_j$ is projected to a two-dimensional image plane of a pre-acquisition viewpoint $\widehat{V_{\hat{k}}}$ by $\text{Proj}(p_j, \widehat{V_{\hat{k}}})$; RoI is a characteristic interpolation operator used to extract a point image characteristic of the target sampling point PP from the high-dimensional characteristic $\widehat{g}_{\hat{k}}$.

Since the target sampling point can be seen at a plurality of viewpoints to be evaluated, the server can use another encoder $\widehat{G_e}$: $R^{\hat{K} \times 32} \to R^{\hat{K} \times 32}$ to associate and combine $\hat{K}$ point image characteristics $\widehat{F^{1st}_{\widehat{V_{\hat{k}}},P_j}}$ to generate a combined image characteristic $\widehat{F^{nth}_{\widehat{V_{\hat{k}}},P_j}}$.

$$\widehat{W_e} = \frac{\widehat{G^e_Q}\left(\{\widehat{F^{1st}_{\widehat{V_{\hat{k}}},P_j}}\}_{\hat{k}=1}^{\hat{K}}\right) \widehat{G^e_K}\left(\{\widehat{F^{1st}_{\widehat{V_{\hat{k}}},P_j}}\}_{\hat{k}=1}^{\hat{K}}\right)^T}{\sqrt{d_k}}$$

$$\widehat{F^{nth}_{\widehat{V_{\hat{k}}},P_j}} = \widehat{G_o}\left(\{\widehat{F^{1st}_{\widehat{V_{\hat{k}}},P_j}}\}_{\hat{k}=1}^{\hat{K}}\right) = \widehat{W_e}\widehat{G^e_V}\left(\{\widehat{F^{1st}_{\widehat{V_{\hat{k}}},P_j}}\}_{\hat{k}=1}^{\hat{K}}\right)$$

where $\widehat{G^e_Q}$, $\widehat{G^e_K}$, and $\widehat{G^e_V}$ are the query matrix, key matrix, and value matrix, respectively, in the encoder $\widehat{G_e}$, and $\widehat{W_e}$ is a weight matrix.

In the embodiments, the point image characteristic for each pre-acquisition viewpoint is extracted, and the image characteristic is obtained by combining a plurality of point image characteristics, thereby improving the accuracy of the image characteristic.

In some embodiments, predicting the reconstructability for the target sampling points based on the image characteristic and the spatial characteristic includes: obtaining a weight matrix based on the spatial characteristic and the image characteristic, and determining the reconstructability of the target sampling point based on the weight matrix and the image characteristic.

Specifically, the server may obtain a weight matrix based on the spatial characteristic and the image characteristic. The server obtains the reconstructability of the target sampling point based on the weight matrix and the image characteristic.

In some embodiments, the encoder includes a query matrix, a key matrix, and a value matrix. The server may multiply a spatial characteristic matrix by the query matrix to obtain a first result, multiply the key matrix by an image characteristic matrix to obtain a second result, multiply the first result by the second result to obtain a third result, and generate the weight matrix based on the third result and a hidden layer size in the encoder.

For example, the server may use the image characteristic of the target sampling point to refine the previously predicted spatial characteristic $R_j$. The server uses the encoder $\widehat{G_d}: (R^{\hat{K} \times 32}, R^{1 \times 256}) \to R^{1 \times 256}$ to extract the importance of the image characteristic $\overline{F_{\hat{V}_k,P_j}^{nth}}$ to the spatial characteristic $F_{p_j}^{nth}$ and outputs a combined characteristic $\widehat{F_{P_j}^{u}}: R^{1 \times 256}$. The specific equation is as follows:

$$\widehat{W_d} = \frac{\widehat{G_Q^d}(F_{p_j}^{nth}) \widehat{G_K^d}(\{\overline{F_{\hat{V}_k,P_j}^{nth}}\}_{k=1}^{\hat{K}})^T}{\sqrt{d_k}}$$

$$\widehat{F_{P_j}^{u}} = \widehat{G_a}(F_{p_j}^{nth}, \overline{F_{\hat{V}_k,P_j}^{nth}}, p_j) = \widehat{W_d}\widehat{G_V^d}(\{\overline{F_{\hat{V}_k,P_j}^{nth}}\}_{k=1}^{\hat{K}})$$

where $\widehat{G_Q^d}$, $\widehat{G_K^d}$, and $\widehat{G_V^d}$ are the query matrix, key matrix, and value matrix, respectively, in the decoder $\widehat{G_d}$, and $\widehat{W_d}$ is a weight matrix, i.e., the weight matrix obtained based on the spatial characteristic and the image characteristic. The equation also involves the reconstructability for the target sampling point based on the weight matrix and the image characteristic. Specifically, the server uses the previously predicted spatial characteristic $F_{p_j}^{nth}$ as a query tensor to represent a purely spatial characteristic around the target sampling point. The server also uses the image characteristic $\{\overline{F_{\hat{V}_k,P_j}^{nth}}\}_{k=1}^{\hat{K}}$ as a keyword and value to refine the spatial characteristic, and inject semantics around the target sampling point $P_j$ into the prediction.

Finally, the server may use the multilayer perception $\widehat{F_u}: R^{1 \times 256} \to R^1$ to predict the geometric reconstructability of the final perception uncertainty of the target sampling point $P_j$, i.e., the comprehensive reconstructability. The specific equation is as follows:

$$\widehat{R_j} = \widehat{F_u}(\widehat{F_{P_j}^{u}})$$

In this embodiment, the weight matrix is obtained based on the spatial characteristic and the image characteristic, and the reconstructability for the target sampling point is obtained based on the weight matrix and the image characteristic, so that the comprehensive reconstructability can perceive the uncertainty, thereby increasing the prediction accuracy.

According to the steps of the above embodiments, the server can give N viewpoints $\{V_i\}_{i=1}^N$ to be evaluated and a target sampling point $P_j$, and perform the reconstructability prediction using a learning function $G_s: (R^{6 \times N}, R^6) \to R^1$, the specific equation is as follows:

$$R_j = G_s(\{v_i\}, p_j)$$

where each viewpoint $V_i$ to be evaluated includes a position and a viewing direction; each target sampling point $P_j$ includes a position and a normal vector; and $R_j$ is the geometric reconstructability of the target sampling point, which indicates the degree to which the target sampling point $P_j$ is reconstructed by a plurality of viewpoints $\{V_i\}$ to be evaluated.

In the case that there is a target captured image, the uncertainty of the geometry of the given target scene can be taken into account by the server when predicting the reconstructability. Compared to the learning function $G_s$ described above, the target captured image provides rich texture information, which is helpful for the reconstructability prediction and subsequent path planning. Specifically, the server can learn another function $\widehat{G_s}: (R^{L \times 3 \times H \times W}, R^{6 \times L}, R^{6 \times N}, R^6) \to R^1$, and the specific equation for predicting the reconstructability is as follows:

$$\widehat{R_j} = \widehat{G_s}(\{\widehat{I_l}\}, \{\widehat{v_l}\}, \{v_i\}, p_j)$$

where $\{\widehat{I_l}\}_{l=1}^L$ is a RGB image set (the resolution of which is H×W) from a pre-flight; $\{\widehat{v_l}\}_{l=1}^L$ is a relevant camera poses; and $\widehat{R_j}$ is a comprehensive reconstructability that takes into account the potential uncertainty surrounding the rough geometry. According to the above embodiments, a corresponding network structure is shown in FIG. 4.

Figure 4:
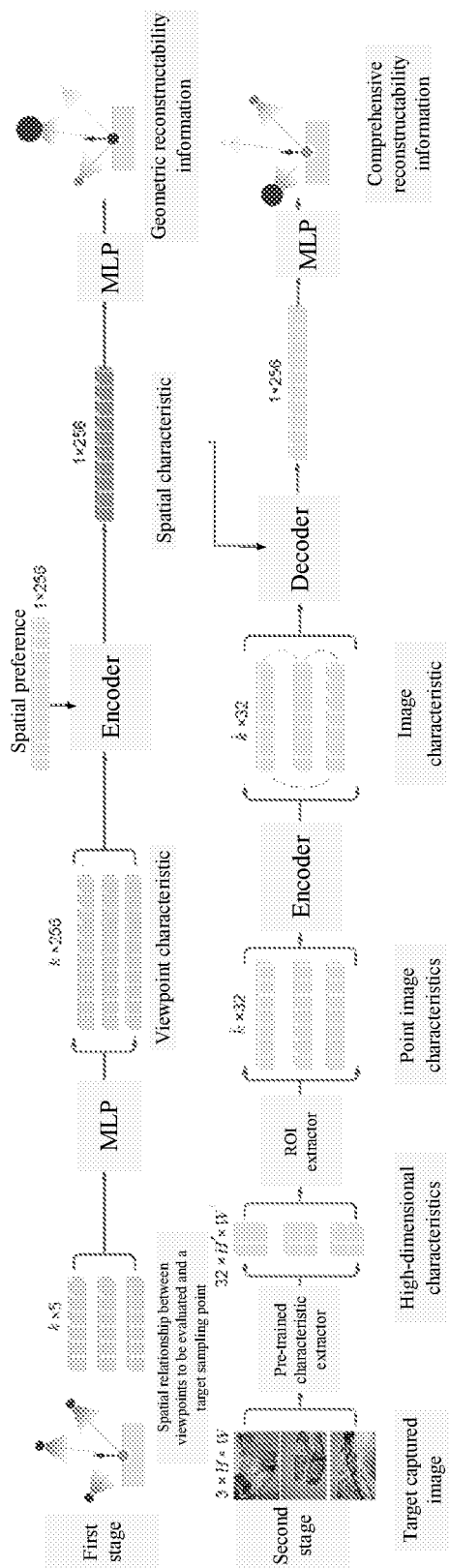
FIG. 4 is a principle schematic diagram of a method for predicting reconstructability according to an embodiment.

In FIG. 4, K is the number of first viewpoints corresponding to a target sampling point. $\hat{K}$ is the number of pre-acquisition viewpoints. A pre-trained feature extractor is provided. ROI extractor is a region of interest extractor. The Transformer model includes an encoder and a decoder. In the first stage, the server obtains K viewpoints to be evaluated for a target sampling point. The target sampling point is located on a rough geometric model. For each viewpoint to be evaluated, the server determines a spatial relationship between the viewpoint to be evaluated and the target sampling point. The spatial relationship includes a three-dimensional polar coordinate of the viewpoint to be evaluated with respect to the target sampling point, a first included angle between the normal at the target sampling point and the direction of the target sampling point to the viewpoint to be evaluated, and a second included angle between the viewing direction of the viewpoint to be evaluated and the direction from the viewpoint to be evaluated to the target sampling point. It can be understood that the spatial relationship includes five dimensions. The server determines a viewpoint characteristic (256 dimensions) of the viewpoint to be evaluated based on the spatial relationship between the viewpoint to be evaluated and the target sampling point. The server combines a plurality of viewpoint characteristics corresponding to a plurality of viewpoints to be evaluated to obtain the spatial characteristic (256 dimensions) of the target sampling point. The server can use a MLP for the spatial characteristic to obtain a geometric reconstructability of the target sampling point. In the second stage, there are three target captured images. The server obtains a plurality of pre-acquisition viewpoints based on the poses of the camera capturing the target captured images, and extracts three high-dimensional characteristics from the captured images. For each pre-acquisition viewpoint, the server converts three-dimensional position information of the target sampling point into two-dimensional position information in each target captured image based on a six-dimensional coordinate of the pre-acquisition viewpoint. The server extracts a point image characteristic (32 dimensions) of the target sampling point from each high-dimensional characteristic based on the two-dimensional position information. The server combines a plurality of point image characteristics to obtain an image characteristic (32 dimensions) of the target sampling point. Then, the server combines the spatial characteristic and the image characteristic, obtains a weight matrix based on the spatial characteristic and the image characteristic, and obtains a comprehensive reconstructability of the target sampling point based on the weight matrix and the image characteristic. In this way, the interaction relationships between a plurality of viewpoints to be evaluated are analyzed, and the uncertainty level of a given rough geometric model is also predicted in real time in conjunction with the target captured images, Therefore, the reconstruction qualities of a plurality of viewpoints to be evaluated for the area to be reconstructed can be predicted more accurately.

Figure 5:
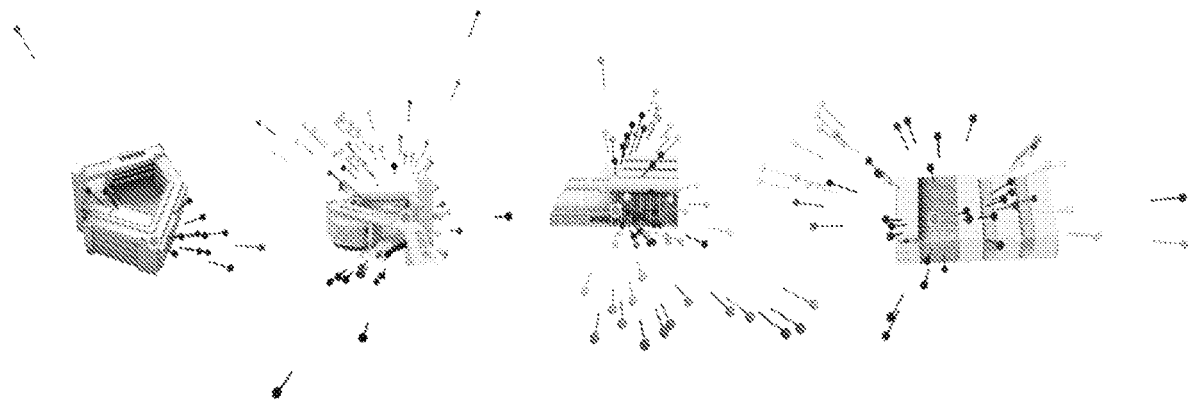
FIG. 5 is a schematic diagram showing an effect of a method for predicting reconstructability according to an embodiment.

For the present method, reconstructability prediction was tested in different target scenarios. The Spearman's correlation coefficient is selected as an evaluation index. The prediction result of a better predicting method of reconstructability should have a higher correlation with the final reconstruction quality. The present method is tested in 4 scenarios, 3 path modes, 2 different sample rates, and 4 different rough geometric models totaling 96 paths. Compared to other traditional methods, the present method can increase the accuracy of reconstructability prediction by 153% on average. FIG. 5 shows the prediction results of the present method in a test scenario. In FIG. 5, the darker the color of the viewpoint to be evaluated, the higher its weight in the process of predicting reconstructability. The present method can effectively extract the correlation between the viewpoints to be evaluated. For example, viewpoints to be evaluated that are farther away from the target sampling point have lower weights, and viewpoints to be evaluated with a large overlap rate contribute more to the reconstructability prediction.

It should be understood that, although the steps in the flowcharts involved in the above embodiments are sequentially shown by the indications of the arrows, these steps are not necessarily executed in the order indicated by the arrows. Unless explicitly stated herein, the execution of these steps is not strictly limited to the order, and the steps may be executed in other orders. Moreover, at least a part of the steps in the flowcharts involved in the above embodiments may include multiple steps or multiple stages, and these steps or stages are not necessarily executed and completed at the same time, but may be performed at different times. The execution order of these steps or stages is not necessarily sequential, but may be performed alternately or in turn with other steps or at least a part of the steps or stages of the other steps.

Based on the same concept, the embodiments of the present disclosure also provide a device for predicting reconstructability that is configured to implement the above-mentioned method for predicting reconstructability. The solution provided by the device for solving the problem is similar to the solution provided by the method described above, therefore, for the specific limitations in one or more embodiments of the device for predicting reconstructability provided below, reference can be made to the foregoing definitions of the method for predicting reconstructability and will not be repeated herein.

Figure 6:
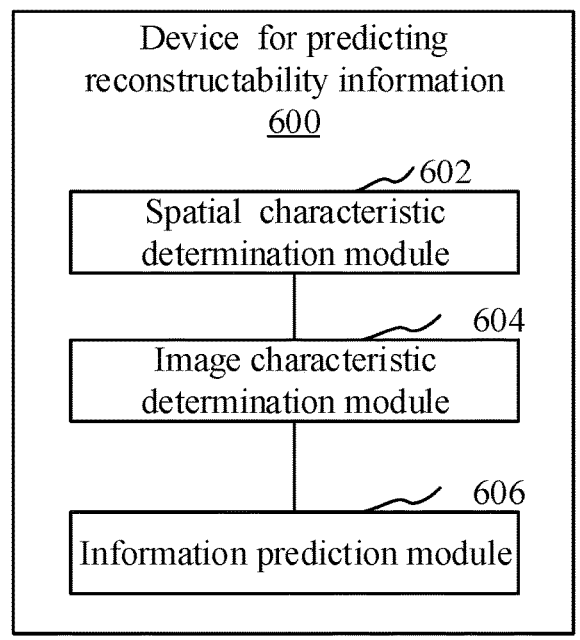
FIG. 6 is a block diagram of a structure of a device for predicting reconstructability according to an embodiment.

In some embodiments, as shown in FIG. 6, a device 600 for predicting reconstructability is provided. The device 600 includes a spatial characteristic determination module 602, an image characteristic determination module 604, and an information prediction module 606.

The spatial characteristic determination module 602 is configured to obtain a plurality of viewpoints to be evaluated for a target sampling point. The target sampling point is located on a rough geometric model. A spatial characteristic of the target sampling point is obtained based on spatial relationships between the plurality of viewpoints to be evaluated and the target sampling point.

The image characteristic determination module 604 is configured to extract an image characteristic of the target sampling point from a target captured image based on a plurality of pre-acquisition viewpoints. The pre-acquisition viewpoints are obtained based on the poses of the camera capturing the target captured image. The target captured image is the image containing the target sampling point.

The information prediction module 606 is configured to predict the reconstructability of the target sampling point based on the image characteristic and the spatial characteristic.

In some embodiments, the reconstructability is comprehensive reconstructability, and the device 600 for predicting the reconstructability is also configured to obtain geometric reconstructability for the target sampling point based on the spatial characteristic.

In some embodiments, the spatial characteristic determination module 602 is further configured to determine, for each viewpoint to be evaluated, a viewpoint characteristic of the viewpoint to be evaluated based on the spatial relationship between the viewpoint to be evaluated and the target sampling point, and combine a plurality of viewpoint characteristics corresponding to the plurality of viewpoints to be evaluated to obtain the spatial characteristic of the target sampling point.

In some embodiments, the image characteristic determination module 604 is further configured to obtain a plurality of pre-acquisition viewpoints based on the poses of the camera capturing the target captured image and extract a high-dimensional characteristic from the target captured image. For each pre-acquisition viewpoint, the image characteristic determination module 604 further convert three-dimensional position information of the target sampling point into two-dimensional position information in the target captured image based on a six-dimensional coordinate of the pre-acquisition viewpoint, extract a point image characteristic of the target sampling point from the high-dimensional characteristic based on the two-dimensional position information, and obtain the image characteristic of the target sampling point by combining a plurality of point image characteristics.

In one embodiment, the information prediction module 606 is further configured to obtain a weight matrix based on the spatial characteristic and the image characteristic, and determine the reconstructability of the target sampling point based on the weight matrix and the image characteristic.

In some embodiments, the spatial relationship includes a three-dimensional polar coordinate of the viewpoint to be evaluated with respect to the target sampling point, a first included angle between the normal at the target sampling point and the direction from the target sampling point to the viewpoint to be evaluated, and a second included angle between the viewing direction of the viewpoint to be evaluated and the direction from the viewpoint to be evaluated to the target sampling point.

According to the device for predicting reconstructability, a plurality of viewpoints to be evaluated for the target sampling point are obtained. The target sampling point is located on a rough geometric model. The spatial characteristic of the target sampling point is obtained based on the spatial relationships between the plurality of viewpoints to be evaluated and the target sampling point. The image characteristic of the target sampling point is extracted from the target captured image based on a plurality of pre-acquisition viewing points. The pre-acquisition viewpoints are obtained based on the poses of the camera capturing the target captured image. The target captured image is the image containing the target sampling point. The reconstructability for the target sampling points is predicted based on the image characteristic and the spatial characteristic. In this way, the image characteristic obtained by using the real target captured image and the spatial characteristic obtained by using the rough geometric model are combined for analysis, thereby improving the accuracy of the reconstructability.

Specific limitations of the aforementioned device for predicting reconstructability can be found in the foregoing limitations of the aforementioned method for predicting reconstructability, which will not repeated herein. Each module in the aforementioned device for predicting reconstructability may be implemented in whole or in part by software, hardware, and combinations thereof. The aforementioned modules may be embedded in hardware or independently of the processor in the computer device, or may be stored in software in memory in the computer device to facilitate calling the processor to perform operations corresponding to each of the above modules.

Figure 7:
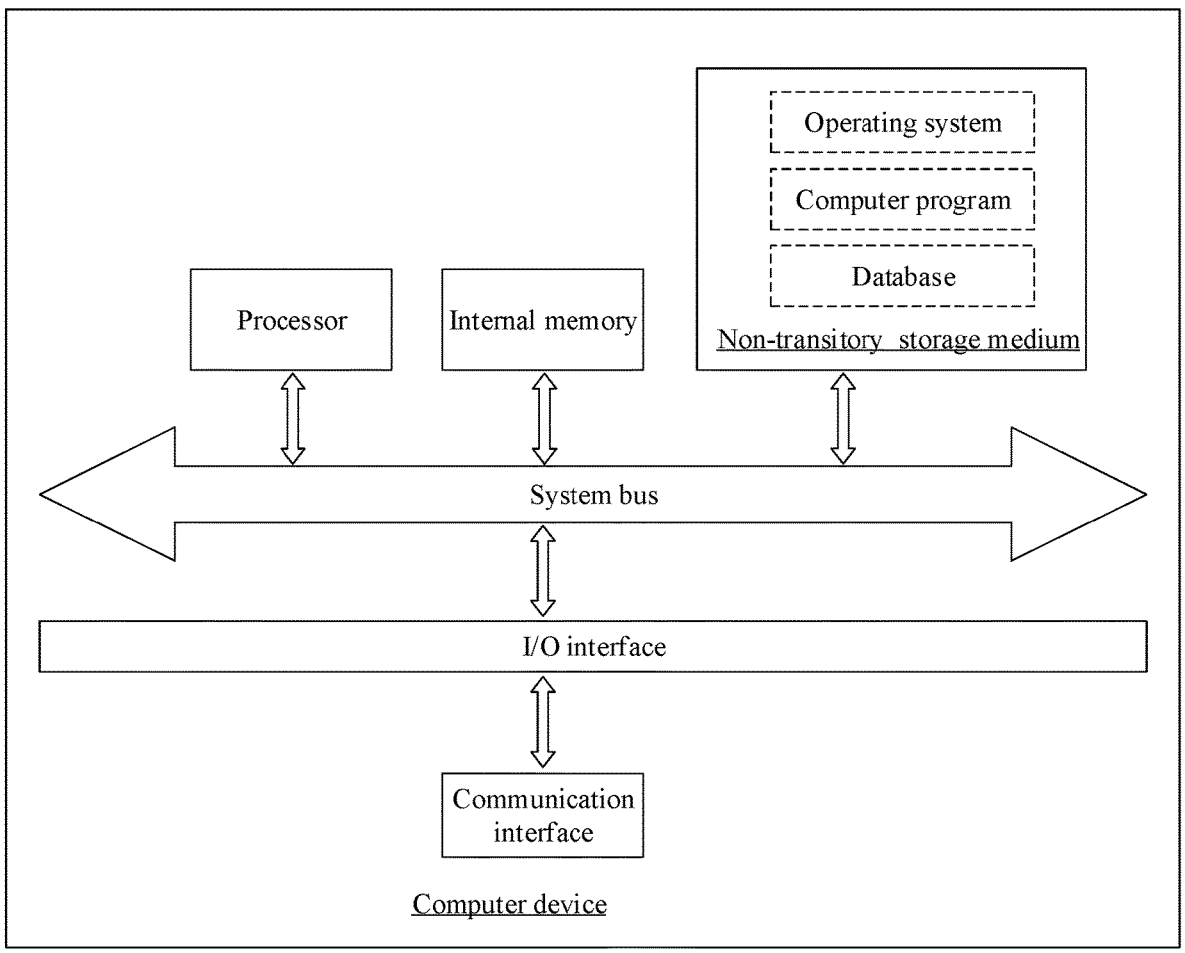
FIG. 7 is a diagram showing an internal structure of a computer device according to an embodiment.

In some embodiments, a computer device is provided. The computer device may be a server, the internal structure diagram of which is shown in FIG. 7. The computer device includes a processor, memory, an input/output interface, and a communication interface. The processor, the memory, and the input/output interface are connected through a system bus, and the communication interface is connected to the system bus through the input/output interface. The processor of the computer device is configured to provide computing and control capabilities. The memory of the computer device includes a non-transitory storage medium and an internal memory. The non-transitory storage medium stores an operating system and computer programs. The internal memory provides an environment for running the operating system and the computer programs in the non-transitory storage medium. The input/output interface of the computer device is configured to exchange information between the processor and external devices. The communication interface of the computer device is used to communicate with external terminals through a network connection. The computer program is executed by the processor to implement a method for predicting reconstructability.

Figure 8:
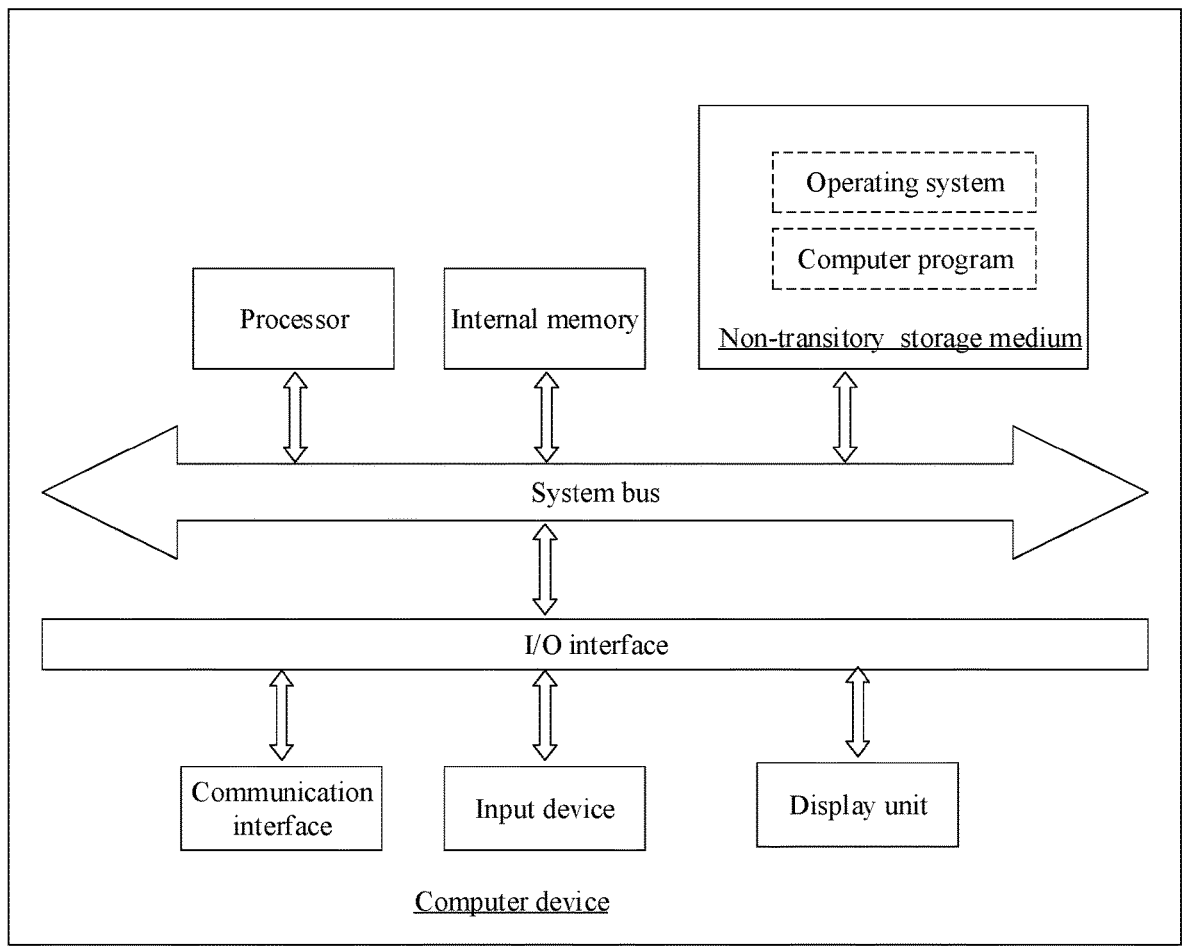
FIG. 8 is a diagram showing an internal structure of a computer device according to an embodiment.

In some embodiments, a computer device is provided. The computer device may be a terminal, an internal structure diagram of which is shown in FIG. 8. The computer device includes a processor, a memory, an input/output interface, a communication interface, a display unit, and an input device. The processor, the memory and the input/output interface are connected through a system bus. The communication interface, the display unit and the input device are connected to the system bus through the input/output interface. The processor of the computer device is configured to provide computing and control capabilities. The memory of the computer device includes a non-transitory storage medium and an internal memory. The non-transitory storage medium stores an operating system and computer programs. The internal memory provides an environment for running the operating system and computer programs in the non-transitory storage medium. The input/output interface of the computer device is configured to exchange information between the processor and external devices. The communication interface of the computer device is configured to be in wired or wireless communication with external terminals, and the wireless communication may be realized by Wi-Fi, mobile cellular network, near-field communication (NFC) or other technologies. The computer programs are executed by the processor to implement a method for predicting reconstructability. The display unit of the computer device is configured to form a visually visible picture. The display unit may be a display screen, a projection device, or a virtual reality imaging device. The display screen may be a liquid crystal display screen or an electronic ink display screen. The input device of the computer device may be a touch layer covered on the display screen; it may also be a key, a trackball or a touchpad disposed on the housing of the computer device; and it may also be an external keyboard, a touchpad or a mouse, etc.

Those skilled in the art will understand that the structures shown in FIG. 7 and FIG. 8 are merely block diagrams of a portion of the structures associated with the solution of the present disclosure, and do not constitute a limitation of the computer device to which the solution of the present disclosure applies. A specific computer device may include more or less components than those shown in the figures, or may combine certain components, or may have different component arrangements.

In some embodiments, a computer device is provided, which includes a memory and a processor. The memory stores a computer program therein. The processor, when executing the computer program, performs the steps of the method for predicting reconstructability in the various embodiments described above.

In some embodiments, a non-transitory computer-readable storage medium is provided, in which a computer program is stored. The computer program, when executed by a processor, cases the processor to perform the steps of the method for predicting reconstructability in the various embodiments described above.

In one embodiment, a computer program product is provided, which includes a computer program. The computer program, when executed by a processor, cases the processor to perform the steps of the method for predicting reconstructability in the various embodiments described above.

Those of ordinary skill in the art can understand that all or part of the processes of the methods of the above embodiments can be achieved by computer programs instructing the relevant hardware to do so. The computer program may be stored in a non-transitory computer-readable storage medium. When the computer program is executed, and when executed, perform the processes of the methods of the above-mentioned embodiments. The memory, database, or other medium recited in the embodiments of the present disclosure include at least one of non-transitory and transitory memory. The non-transitory memory may include a Read-Only Memory (ROM), a magnetic tape, a floppy disk, a flash memory, an optical memory, etc. The transitory memory may include a Random Access Memory (RAM) or an external cache memory. By way of illustration and not limitation, the RAM may be in various forms, such as a Static Random Access Memory (SRAM), or a Dynamic Random Access Memory (DRAM), etc.

The technical features of the foregoing embodiments may be freely combined. For brevity, not all possible combinations of the technical features in the foregoing embodiments are described. However, the combinations of these technical features should be considered to be included within the scope of this disclosure, as long as the combinations are not contradictory.

The above-mentioned embodiments express only several embodiments of the present disclosure, and the descriptions thereof are relatively specific and detailed, but should not be construed as a limitation on the scope of the patent of the present disclosure. It should be noted that for those skilled in the art, variations and improvements can be made without departing from the concept of the present disclosure, which all belong to the protection scope of the present disclosure. Therefore, the protection scope of the present disclosure shall be subject to the attached claims.

What is claimed is:

1. A method for predicting reconstructability, comprising:
    obtaining a plurality of viewpoints to be evaluated for a target sampling point, the target sampling point being located on a rough geometric model;
    obtaining a spatial characteristic of the target sampling point based on spatial relationships between the plurality of viewpoints to be evaluated and the target sampling point;
    extracting an image characteristic of the target sampling point from a target captured image based on a plurality of pre-acquisition viewpoints, the pre-acquisition viewpoints being obtained based on poses of a camera capturing the target captured image, the target captured image being an image containing the target sampling point; and
    predicting reconstructability for the target sample point based on the image characteristic and the spatial characteristic;
    wherein extracting the image characteristic of the target sampling point from the target captured image based on the plurality of pre-acquisition viewpoints comprises:
        obtaining a plurality of pre-acquisition viewpoints based on the poses of the camera capturing the target captured image;
        extracting a high-dimensional characteristic from the target captured image,
        for each pre-acquisition viewpoint, converting three-dimensional information of the target sampling point into two-dimensional position information in the target captured image based on a six-dimensional coordinate of the pre-acquisition viewpoint, and extracting a point image characteristic of the target sampling point from the high-dimensional characteristic based on the two-dimensional position information, and
        obtaining the image characteristic of the target sampling point by combining a plurality of the point image characteristics.

2. The method of claim 1, wherein the reconstructability is comprehensive reconstructability, and the method further comprises:
    obtaining geometric reconstructability for the target sample point based on the spatial characteristic.

3. The method of claim 1, wherein the obtaining the spatial characteristic of the target sampling point based on the spatial relationships between the plurality of viewpoints to be evaluated and the target sampling point comprises:
    for each viewpoint to be evaluated, determining a viewpoint characteristic of the viewpoint to be evaluated based on the spatial relationship between the viewpoint to be evaluated and the target sampling point; and
    obtaining the spatial characteristic of the target sampling point by combining a plurality of viewpoint characteristics corresponding to the plurality of viewpoints to be evaluated.

4. The method of claim 1, wherein the predicting the reconstructability for the target sample point based on the image characteristic and the spatial characteristic comprises:
    obtaining a weight matrix based on the spatial characteristic and the image characteristic; and
    obtaining the reconstructability for the target sampling point based on the weight matrix and the image characteristic.

5. The method of claim 1, wherein for each viewpoint to be evaluated, the spatial relationship comprises a three-dimensional polar coordinate of the viewpoint to be evaluated with respected to the target sample point, a first included angle between a normal at the target sampling point and a direction from the target sampling point to the viewpoint to be evaluated, and a second included angle between a viewing direction of the viewpoint to be evaluated and a direction from the viewpoint to be evaluated to the target sampling point.

6. The method of claim 2, wherein a standard multilayer perception $G_e: R^{1 \times 256} \to R^1$ is employed to learn to determine the geometric reconstructability Rj from the spatial characteristic $F_{p_j}^{nth}$, a specific equation is as follows:

$$R_j = G_e(F_{p_j}^{nth}).$$

7. The method of claim 3, wherein a multilayer perception $G_1(v_i, p_j): R^{1 \times 5} \to R^{1 \times 256}$ is employed to extract the viewpoint characteristic $F_{v_i, p_j}^{1st}$, $R^{1 \times 5}$ is a dimension of parameters, and $R^{1 \times 256}$ is a dimension of returned values, a specific equation for determining the viewpoint characteristic is as follows:

$$F_{v_i, p_j}^{1st} = G(v_i, p_j)$$

where $F_{v_i, p_j}^{1st}$ is the viewpoint characteristic of the viewpoint $V_i$ to be evaluated of the target sampling point $P_j$.

8. The method of claim 4, wherein a method for generating the weight matrix is generated comprises:
    multiplying a spatial characteristic matrix by a query matrix of an encoder to obtain a first result;
    multiplying a key matrix of the encoder by an image characteristic matrix to obtain a second result;
    multiplying the first result by the second result to obtain a third result, and
    generating the weight matrix based on the third result and a hidden layer size in the encoder.

9. A computer device, comprising a memory and a processor, the memory comprising a computer program stored therein, wherein the processor, when executing the computer program, performs a method for predicting reconstructability, the method comprising:
    obtaining a plurality of viewpoints to be evaluated for a target sampling point, the target sampling point being located on a rough geometric model;
    obtaining a spatial characteristic of the target sampling point based on spatial relationships between the plurality of viewpoints to be evaluated and the target sampling point;
    extracting an image characteristic of the target sampling point from a target captured image based on a plurality of pre-acquisition viewpoints, the pre-acquisition viewpoints being obtained based on poses of a camera capturing the target captured image; the target captured image being an image containing the target sample point; and predicting reconstructability for the target sample point based on the image characteristic and the spatial characteristic;

wherein extracting the image characteristic of the target sampling point from the target captured image based on the plurality of pre-acquisition viewpoints comprises:

obtaining a plurality of pre-acquisition viewpoints based on the poses of the camera capturing the captured image;

extracting a high-dimensional characteristic from the target captured image;

for each pre-acquisition viewpoint converting three-dimensional information of the target sampling point in to two-dimensional position information in the target captured image based on a six-dimensional coordinate of the pre-acquisition viewpoint, and extracting a point image characteristic of the target sampling point from the high-dimensional characteristic based on the two-dimensional position information; and obtaining the image characteristic of the target sampling point by combining a plurality of the point image characteristics.

10. The computer device of claim 9, wherein the reconstructability is comprehensive reconstructability, and the method further comprises:

obtaining geometric reconstructability for the target sample point based on the spatial characteristic.

11. The computer device of claim 9, wherein the obtaining the spatial characteristic of the target sampling point based on the spatial relationships between the plurality of viewpoints to be evaluated and the target sampling point comprises:

for each viewpoint to be evaluated, determining a viewpoint characteristic of the viewpoint to be evaluated based on the spatial relationship between the viewpoint to be evaluated and the target sampling point; and obtaining the spatial characteristic of the target sampling point by combining a plurality of viewpoint characteristics corresponding to the plurality of viewpoints to be evaluated.

12. The computer device of claim 9, wherein the predicting the reconstructability for the target sample point based on the image characteristic and the spatial characteristic comprises:

obtaining a weight matrix based on the spatial characteristic and the image characteristic; and obtaining the reconstructability for the target sampling point based on the weight matrix and the image characteristic.

13. The computer device of claim 9, wherein for each viewpoint to be evaluated, the spatial relationship comprises a three-dimensional polar coordinate of the viewpoint to be evaluated with respected to the target sample point, a first included angle between a normal at the target sampling point and a direction from the target sampling point to the viewpoint to be evaluated, and a second included angle between a viewing direction of the viewpoint to be evaluated and a direction from the viewpoint to be evaluated to the target sampling point.

14. The computer device of claim 10, wherein a standard multilayer perception $G_e$: $R^{1\times256} \to R^1$ is employed to learn to determine the geometric reconstructability Rj from the spatial characteristic $F_{p_j}^{nth}$, a specific equation is as follows:

$$R_j = G_e(F_{p_j}^{nth}).$$

15. The computer device of claim 11, wherein a multilayer perception $G_1(v_i, p_j)$: $R^{1\times5} \to R^{1\times256}$ is employed to extract the viewpoint characteristic $F_{v_i,p_j}^{1st}$, $R^{1\times5}$ is a dimension of parameters, and $R^{1\times256}$ is a dimension of returned values, a specific equation for determining the viewpoint characteristic is as follows:

$$F_{v_i p_j}^{1st} = G(v_i, p_j)$$

where $F_{v_i p_j}^{1st}$ is the viewpoint characteristic of the viewpoint $V_i$ to be evaluated of the target sampling point $P_j$.

16. The computer device of claim 12, wherein a method for generating the weight matrix is generated comprises:

multiplying a spatial characteristic matrix by a query matrix of an encoder to obtain a first result;

multiplying a key matrix of the encoder by an image characteristic matrix to obtain a second result;

multiplying the first result by the second result to obtain a third result, and generating the weight matrix based on the third result and a hidden layer size in the encoder.

17. A non-transitory computer-readable storage medium having stored therein a computer program, wherein the computer program, when executed by a processor, causes the processor to perform the method of claim 1.

* * * * *